United States Patent
Suzuki et al.

(10) Patent No.: US 7,600,777 B2
(45) Date of Patent: Oct. 13, 2009

(54) SIDE AIRBAG APPARATUS

(75) Inventors: Shigeyuki Suzuki, Aichi-ken (JP); Yuji Sato, Aichi-ken (JP); Toshinori Tanase, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 424 days.

(21) Appl. No.: 11/489,674

(22) Filed: Jul. 20, 2006

(65) Prior Publication Data
US 2007/0024033 A1 Feb. 1, 2007

(30) Foreign Application Priority Data
Jul. 29, 2005 (JP) .............................. 2005-220140

(51) Int. Cl.
*B60R 21/207* (2006.01)

(52) U.S. Cl. ................. 280/730.2; 280/743.2

(58) Field of Classification Search .............. 280/730.2, 280/743.1, 743.2
See application file for complete search history.

(56) References Cited

U.S. PATENT DOCUMENTS

| | | | |
|---|---|---|---|
| 5,447,326 A * | 9/1995 | Laske et al. .............. | 280/728.3 |
| 5,570,905 A * | 11/1996 | Dyer ........................ | 280/743.2 |
| 5,924,721 A * | 7/1999 | Nakamura et al. ........ | 280/730.2 |
| 6,170,871 B1 * | 1/2001 | Goestenkors et al. .... | 280/743.1 |
| 6,186,540 B1 * | 2/2001 | Edgren ...................... | 280/735 |
| 6,189,928 B1 * | 2/2001 | Sommer et al. .......... | 280/743.2 |
| 6,422,597 B1 * | 7/2002 | Pinsenschaum et al. ..... | 280/735 |
| 6,616,184 B2 * | 9/2003 | Fischer ..................... | 280/743.2 |
| 6,648,371 B2 * | 11/2003 | Vendely et al. ............ | 280/739 |
| 7,422,235 B2 * | 9/2008 | Wollin et al. ............. | 280/730.2 |
| 2003/0168836 A1 * | 9/2003 | Sato et al. ................. | 280/730.2 |
| 2004/0021304 A1 * | 2/2004 | Tanase et al. ............. | 280/729 |
| 2005/0057027 A1 * | 3/2005 | Fogle et al. ................ | 280/739 |
| 2006/0022439 A1 * | 2/2006 | Bayley et al. .............. | 280/729 |
| 2006/0038386 A1 * | 2/2006 | Shibayama et al. ...... | 280/730.2 |

FOREIGN PATENT DOCUMENTS

| | | |
|---|---|---|
| JP | A-2004-189187 | 7/2004 |
| JP | 2004276808 A  * | 10/2004 |

* cited by examiner

*Primary Examiner*—Paul N Dickson
*Assistant Examiner*—Laura Freedman
(74) *Attorney, Agent, or Firm*—Posz Law Group, PLC

(57) ABSTRACT

A side airbag apparatus includes an inflator and an airbag. The airbag that is deployed and inflated in a space between a body side portion of a vehicle and an occupant seated on a front seat in a passenger compartment by the pressure of gas injected from the inflator. The apparatus also includes a pair of hook devices and tethers. The hook devices are located at the rear end in the airbag. Each tether extends in the fore-and-aft direction of the vehicle and has an end hooked to one of the hook devices and an end fixed to the front inner end of the airbag. The tethers suppress the expansion of the airbag in the fore-and-aft direction of the vehicle, thereby promoting the expansion of the airbag in the lateral direction of the vehicle. Further, the apparatus includes an occupant size detector for detecting the size of the occupant. When the size of the occupant detected by the occupant size detector is equal to or smaller than a reference size that is determined in advance, the hook devices release the tethers.

12 Claims, 4 Drawing Sheets

SIDE AIRBAG APPARATUS

BACKGROUND OF THE INVENTION

The present invention relates to a side airbag apparatus that is deployed and inflated at a side of an occupant of a vehicle.

When an impact that is equal to or greater than a predetermined value is applied to a body side portion of a vehicle because of a collision (side collision), a typical side airbag apparatus deploys and inflates an airbag at a side of an occupant to reduce the impact applied to the occupant, thereby protecting the thorax or lumbar region of the occupant. Such side airbag apparatuses have been disclosed in, for example, Japanese Laid-Open Patent Publication No. 2004-189187. The side airbag apparatus has a belt-like tether that connects a front end and a rear end of the interior of the airbag. A part of the tether in the longitudinal direction is folded such that a loop having a predetermined width and overlapped portions is formed. The overlapped portions of the loop are sewn to each other to form a breakable portion.

When the air bag is deployed and inflated, tension of the tether limits the amount of expansion along the fore-and-aft direction of the vehicle, while increasing the amount of expansion along the lateral direction of the vehicle to protect an occupant. When, in this state, the tether breakable portion is broken as the pressure in the airbag increases, the tether is extended to be longer. This increases the expansion amount of the airbag along the fore-and-aft direction. At the same time, the expansion amount along the lateral direction of the vehicle is reduced so that the pressing force of the airbag applied to the occupant is reduced.

According to the side airbag apparatus disclosed in Japanese Laid-Open Patent Publication No. 2004-189187, the behavior of the airbag during deployment and inflation is controlled by changing the tension during inflation of the airbag regardless of the sizes of the occupant. That is, such an airbag apparatus still has plenty of room for improvement in terms of improved protection of occupants in accordance with the size of the occupant.

SUMMARY OF THE INVENTION

Accordingly, it is an objective of the present invention to provide a side airbag apparatus that effectively protects an occupant regardless of the size of the occupant.

To achieve the foregoing objectives and In accordance with one aspect of the present invention, a side airbag apparatus including a gas generator, an airbag, an expansion promoting mechanism, an occupant size detector, and a promotion canceling mechanism is provided. The airbag is deployed and inflated in a space between a body side portion of a vehicle and an occupant seated on a seat in a passenger compartment by the pressure of gas injected from the gas generator. The expansion promoting mechanism is provided in the airbag. When the airbag is deployed and inflated, the expansion promoting mechanism promotes the expansion of the airbag in a lateral direction of the vehicle. The occupant size detector detects the size of the occupant. The promotion canceling mechanism cancels the expansion promoting function of the expansion promoting mechanism when the size of the occupant detected by the occupant size detector is equal to or smaller than a reference size that is determined in advance.

In accordance with another aspect of the present invention, a side airbag apparatus including an inflator, an airbag, a hook device, a tether, and an occupant size detector is provided. The airbag is deployed and inflated in a space between a body side portion of a vehicle and an occupant seated on a seat in a passenger compartment by the pressure of gas injected from the inflator. The airbag has a first inner end and a second inner end opposite to each other with respect to the fore-and-aft direction of the vehicle. The hook device is located at the first inner end. The tether extends in the fore-and-aft direction of the vehicle. The tether has an end hooked to the hook device and an end fixed to the second inner end. The tether suppresses the expansion of the airbag in the fore-and-aft direction of the vehicle, thereby promoting the expansion of the airbag in the lateral direction of the vehicle. The occupant size detector detects the size of the occupant. When the size of the occupant detected by the occupant size detector is equal to or smaller than a reference size that is determined in advance, the hook device releases the tether.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings. Hereafter, the advancing direction of a vehicle is referred to as a forward direction of the vehicle. Unless otherwise specified, a vertical direction and a lateral direction coincide with the vertical direction and the lateral direction with respect to the vehicle advancing direction being defined as the forward direction.

Figure 1:
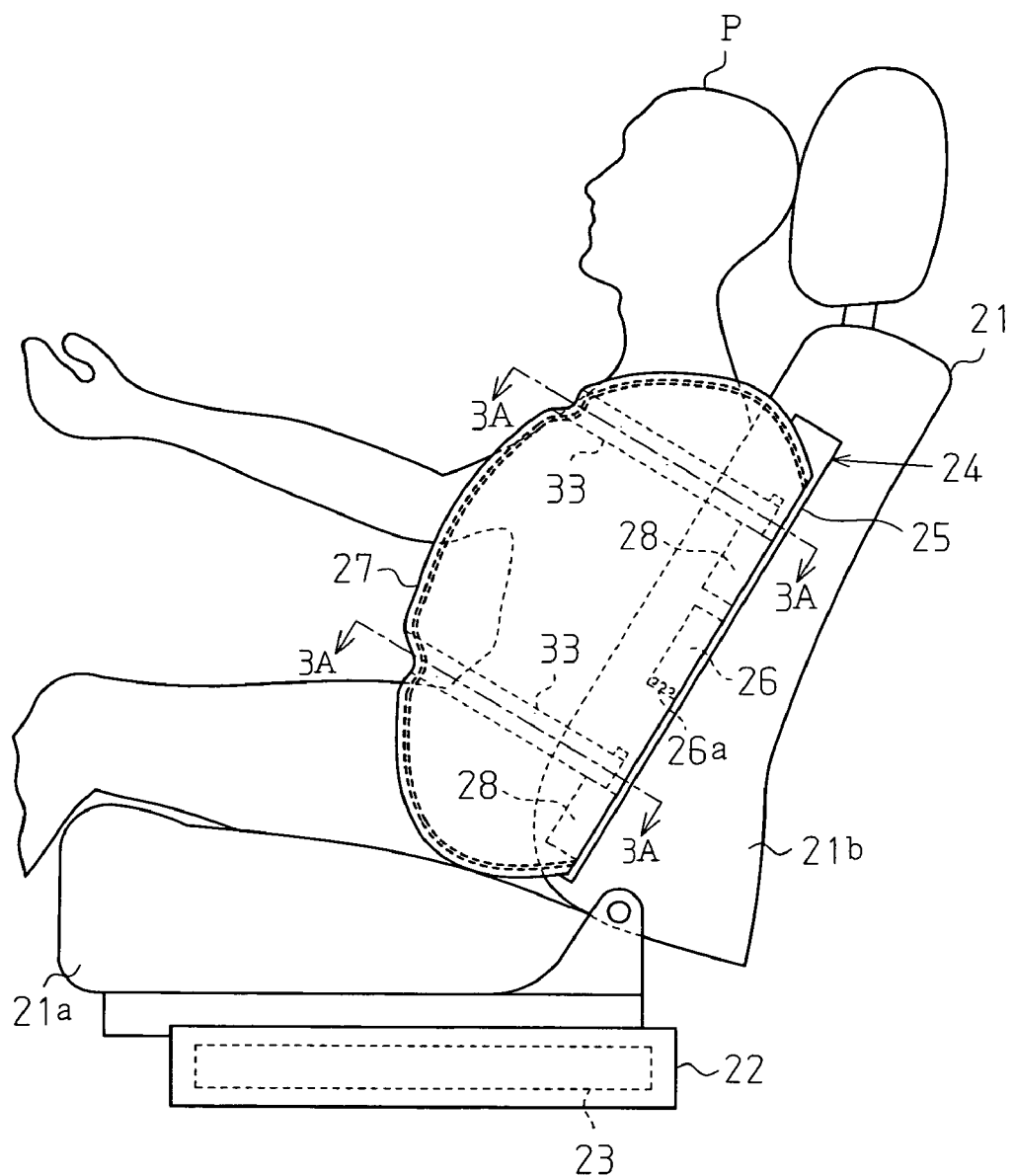
FIG. 1 is a side view illustrating the interior of a vehicle according one embodiment.

FIG. 1 shows a left front seat 21 (driver's seat) located in a passenger compartment. The front seat 21 is located on rails 22 extending in the fore-and-aft direction on the floor of the passenger compartment. The front seat 21 is movable in the fore-and-aft direction along the rails 22. A seat position sensor 23 is provided on the rails 22 to detect the position of the front seat 21 on the rails 22. The front seat 21 includes a seat portion 21a and a backrest 21b. A side airbag apparatus 24, which is accommodated in a case 25, is provided at a left side of the backrest 21b. The side airbag apparatus 24 corresponds to a door (not shown), which forms part of the body side portion of the vehicle. Although only the left front seat 21 is illustrated in the drawings, a right front seat has a similar airbag apparatus in its right portion.

The side airbag apparatus 24 includes a gas generator, which is an inflator 26, and an airbag 27. The inflator 26 is fixed to a center portion of the case 25 with respect to the vertical direction. The airbag 27 covers the inflator 26. The inflator 26 incorporates gas generating agent (not shown) that generates gas to deploy and inflate the airbag 27. The inflator 26 also has gas ports 26a for injecting gas generated by the gas generating agent into the airbag 27. The airbag 27 is formed by folding a single sheet of woven cloth and then sewing the periphery so that a bag is formed. The airbag 27 is normally accommodated in the case 25 in a folded state. The airbag 27 according to the present embodiment is configured to deployed and inflated in a space between the corresponding side portion of the vehicle and the body of an occupant P, specifically a shoulder and a lumbar region of an occupant P seated on the front seat 21. In this example, the occupant P has a size that corresponds to 50th-percentile adult American male (height: 175 cm, weight 75 kg). The size is hereafter referred to as AM50 size. FIG. 1 shows the occupant P of AM50 size seated on the front seat 21.

Figure 2A:
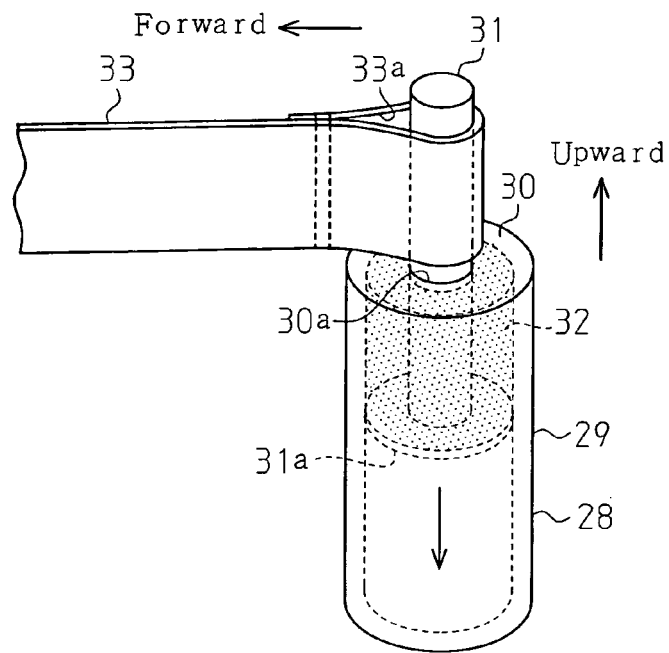
FIG. 2A is a perspective view illustrating a state in which a tether is hooked to an tether hook device.

The side airbag apparatus 24 includes two actuators, or hook devices 28, and covered by the airbag 27. The hook devices 28 are fixed to the case 25. One of the hook devices 28 is located above the inflator 26. The other hook device 28 is located below the inflator 26. As shown in FIG. 2A, each hook device 28 includes a cylindrical case 29 and a disk-shaped lid 30. The case 29 has a closed bottom and an open top, and the lid 30 closes the upper opening of the case 29. A through hole 30a is formed in a center portion of the lid 30. The through hole 30a connects the interior of the case 29 with the outside. A movable hook member, which is a cylindrical rod 31, is received by the through hole 30a. The outer circumferential surface of the rod 31 contacts the inner circumferential surface of the through hole 30a.

Figure 2B:
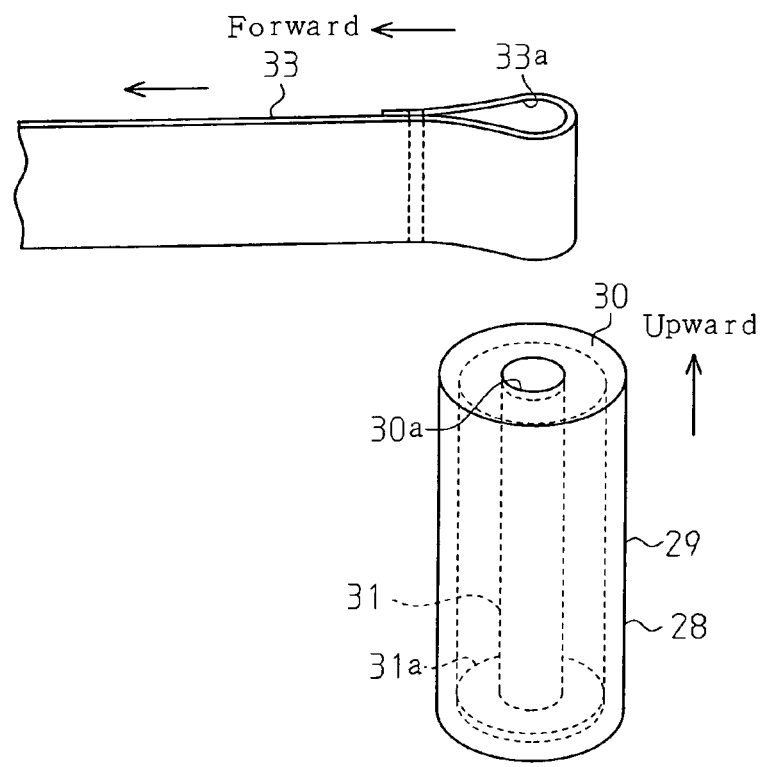
FIG. 2B is a perspective view illustrating a state in which the tether is released from the tether hook device.

The rod 31 has a disk-shaped large diameter portion 31a at the lower end. The large diameter portion 31a has a diameter larger than the rest of the rod 31. The outer circumferential surface of the large diameter portion 31a contacts the inner circumferential surface of the case 29. In a state where approximately half the length of the rod 31 projects upward from the through hole 30a, the rod 31 is held by the frictional force generated between the outer circumferential surface of the large diameter portion 31a and the inner circumferential surface of the case 29 and the frictional force generated between the outer circumferential surface of the rod 31 and the inner circumferential force of the through hole 30a. Gas generating agent 32 is accommodated in the case 29 between the lid 30 and the large diameter portion 31a. When the gas generating agent 32 generates gas, the pressure of the gas causes the rod 31 to slide downward so that the rod 31 is retracted into the case 29 as shown in FIGS. 2A and 2B.

As shown in FIGS. 1 and 2A, the airbag 27 accommodates belt-like tethers 33 at positions corresponding to a shoulder and lumbar region of an occupant P of the AM50 size. Depending on the direction of deployment of the airbag 27, the tethers 33 are extended in a slanting direction. Each tether 33 has a loop portion 33a at the rear end. The loop portion 33a is formed by folding back the rear end of the tether 33 and sewing the folded end to the corresponding portion. The front end of each tether 33 is sewn to the periphery of the airbag 27. The rear ends of the tethers 33 are engaged with the hook devices 28 by inserting each rod 31 into the loop portion 33a at the rear end of the corresponding tether 33.

Figure 3A:
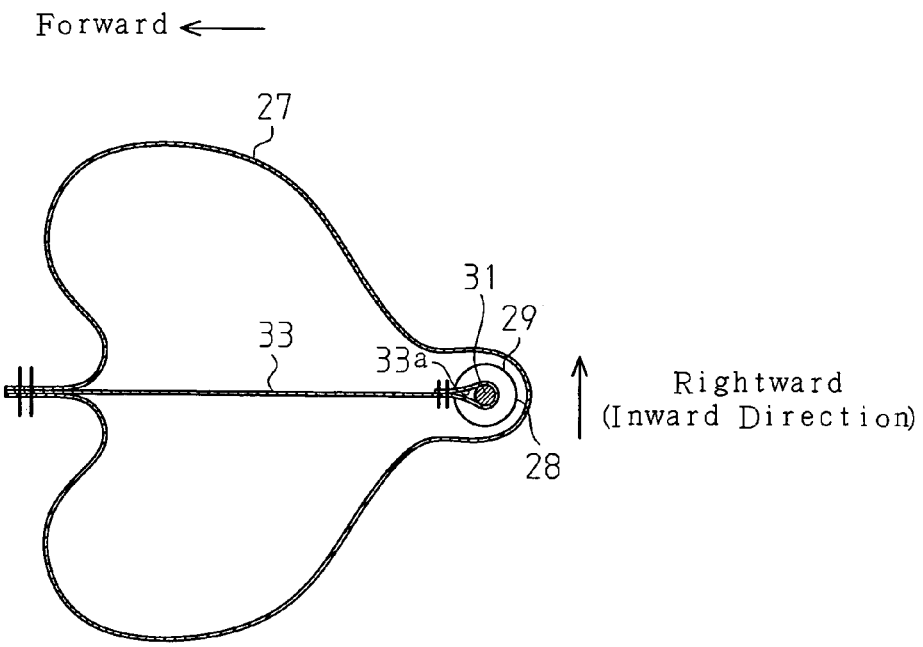
FIG. 3A is a cross-sectional view take along line 3A-3A of FIG. 1, in which the tether is hooked to the hook device.

When the airbag 27 is deployed and inflated, the expansion in the fore-and-aft direction of the sections of the airbag 27 that correspond to a shoulder and the lumbar region of the occupant P of the AM50 size is suppressed, and part of the amount of such an expansion is converted into the lateral expansion by the tension of the tethers 33 as shown in FIG. 3A. That is, the tension of each tether 33 promotes the lateral expansion of the sections of the airbag 27 where the tethers 33 are provided. When the rod 31 of each hook device 28 is retracted in the case 29, the tether 33 is released from the hook device 28, so that the tension of the tether 33 is not applied to the airbag 27. That is, the actuation of the rod 31 cancels the lateral expansion promoting function of the tension of the tethers 33 in the sections where the tethers 33 are provided. In this embodiment, the tethers 33 and the hook devices 28 function as an expansion promoting mechanism, and the hook devices 28 function as a promotion canceling mechanism.

The electrical configuration of the side airbag apparatus 24 will now be described.

Figure 4:
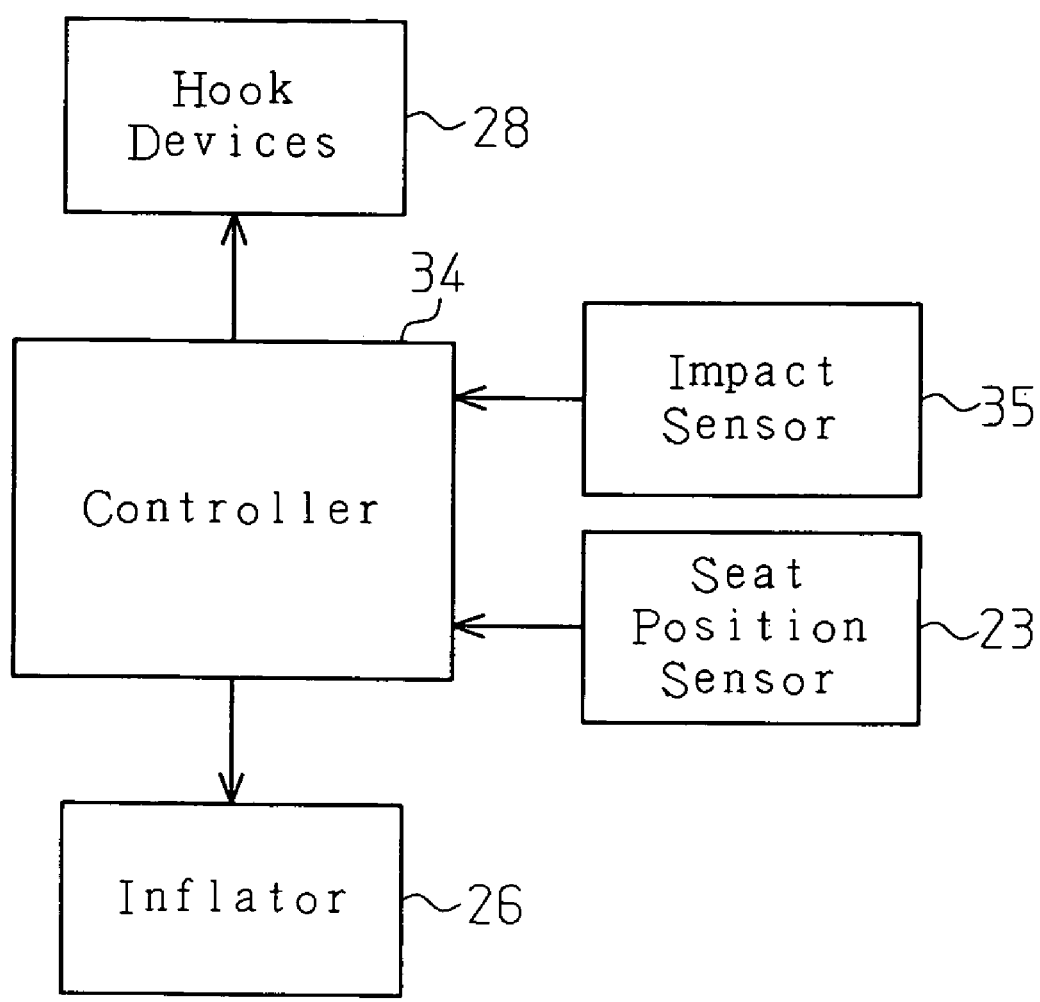
FIG. 4 is a block diagram showing an electrical configuration of the side airbag according the present embodiment.

As shown in FIG. 4, the side airbag apparatus 24 has a controller 34. The controller 34 is electrically connected to an impact sensor 35 that detects impact applied to the body side portion, a seat position sensor 23, the inflator 26, and the hook devices 28. The controller 34 receives a signal from the seat position sensor 23 indicating the position of the front seat 21, and determines whether the occupant P seated on the front seat 21 has a size smaller than or equal to a prescribed reference size. The controller 34 determines that the occupant P has a size smaller than or equal to the reference size when the amount of backward sliding of the front seat 21 from the foremost position (a position of the front seat 21 when maximally moved frontward) is less than a predetermined value (in this embodiment 60 mm). In this embodiment, the reference size is an intermediate size between (average of) the AM50 size and a size that corresponds to 5th-percentile adult American female (height: 160 cm, weight 50 kg, hereafter referred to as AF05 size). That is, whether the occupant P has a size smaller than or equal to the reference size is determined by comparing the size of the occupant P with the average of the AM50 size and the AF05 size. The seat position sensor 23 and the controller 34 function as an occupant size detector.

The operation of the side airbag apparatus 24 will now be described.

When a vehicle collides with the body side portion and the impact of the collision is equal to or greater than a predetermined value, the impact sensor 35 sends a detection signal to the controller 34. The controller 34, in turn, outputs a driving current to the inflator 26. At the same time as the output of the driving current, the controller 34 determines the size of the occupant P based on a detection signal from the seat position sensor 23. When determining that the size of the occupant P is greater than the reference size, the controller 34 does not send a driving current to the hook devices 28. The inflator 26 produces heat based on the inputted driving current. This causes the gas generating agent in the inflator 26 to generate gas. The gas is injected into the airbag 27 through the gas ports 26a.

Since the rods 31 of the hook devices 28 are holding the loop portions 33a of the tethers 33, the lateral size of the airbag 27 at sections corresponding to a shoulder and the lumbar region of the occupant P of the AM50 size is greater than that of the rest of the airbag 27 (state shown in FIG. 3A). Since the volume of the airbag 27 is less than that in the state where the loop portions 33a of the tethers 33 are released (discussed below), the pressure in the airbag 27 is high. Therefore, the airbag 27 preferentially restrains the shoulder and the lumbar region of the occupant P of the AM50 size. That is, a wide range in the body of the occupant P from the shoulder to the lumbar region is effectively protected.

On the other hand, at the time to output a driving current to the inflator 26, the controller 34 outputs a driving current to the hook devices 28 when determining, based on the detection signal from the seat position sensor 23, that the size of the occupant P is smaller than or equal to the reference size. Heat generated by the driving current causes the gas generating agent 32 in each case 29 to generate gas, and the pressure of the gas retracts the rod 31 into the case 29. Simultaneously, the inflator 26 produces heat based on the inputted driving current. This causes the gas generating agent in the inflator 26 to generate gas. The gas is injected into the airbag 27 through the gas ports 26a.

Figure 3B:
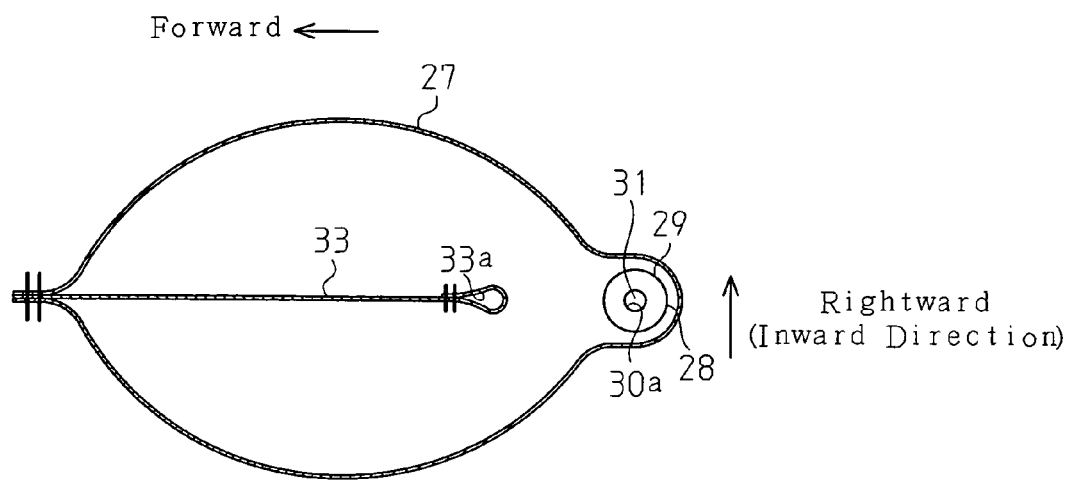
FIG. 3B is a cross-sectional view take along line 3A-3A of FIG. 1, in which the tether is released from the hook device.

Since the rods 31 of the hook devices 28 release the loop portions 33a of the tethers 33, the lateral size of the airbag 27 at the sections corresponding to the shoulder and the lumbar region of the occupant P of the AM50 size becomes substantially the same as that of the rest of the airbag 27 (state shown in FIG. 3B). Since the volume of the airbag 27 is greater than that in the state where the loop portions 33a of the tethers 33 are hooked, the pressure in the airbag 27 is lowered. Thus, an occupant P having a size smaller than or equal to the reference size receives a lower pressure than the pressure applied to an occupant P having a size greater than the reference size. Therefore, the occupant P having a size smaller than or equal to the reference size is gently restrained by the airbag 27, and effectively protected.

The occupant P is effectively protected regardless whether or not the size of the occupant P is larger than the reference size.

The above described present embodiment has the following advantages.

(1) When the occupant P has a size larger than the reference size, the rods 31 are not activated, and the expansion in the lateral direction of the airbag 27 in sections corresponding to the shoulder and the lumbar region is promoted by the tethers 33. This increases the amount of lateral expansion in each of these sections. On the other hand, if the occupant P has a size smaller than or equal to the reference size, the rods 31 are activated so that the tension of the tethers 33 is not applied to the airbag 27. Thus, the lateral expansion of the airbag 27 is not promoted, the lateral expansion of the entire airbag 27 is reduced compared to the case where the occupant P has a size larger than the reference size. Therefore, when the occupant P has a size larger than the reference size, the shoulder and the lumbar region of the occupant P are quickly restrained by the airbag 27. When the occupant has a size smaller than or equal to the reference size, the occupant P is gently restrained by the airbag 27. As a result, the occupant P is reliably protected regardless whether or not the size of the occupant P is larger than the reference size. That is, the occupant P is effectively protected regardless of the size.

(2) The tethers 33 are provided so that the lateral expansion of the airbag is promoted at sections corresponding to a shoulder and the lumbar region of an occupant P of a large size equal to or larger than the AM50 size. Therefore, the sections of the airbag 27 corresponding to the shoulder and the lumbar region of the occupant P of the AM50 size or larger are laterally expanded by a great amount, while a section corresponding to a thorax of the occupant P is expanded by a small amount. That is, since the airbag 27 is inflated to have a constriction at the section corresponding to the thorax of the occupant P having the AM50 size or larger, the impact applied to the occupant P from the airbag 27 are preferentially received by the shoulder and the lumbar region of the occupant P. This reduces the impact applied to the thorax, which has a lower impact resistance than the shoulders and the lumbar region of the occupant P, so that the occupant P is reliably protected.

(3) The expansion promoting mechanism is easily formed by the tethers 33 and the hook devices 28.

(4) Each rod 31 is quickly retracted into the case 29 by the pressure of the gas generated by the gas generating agent 32. That is, the tension of the tethers 33 applied to the airbag 27 is instantly cancelled.

The above embodiment may be modified as follows.

Instead of the seat position sensor 23, a weight sensor may be embedded in the seat portion 21a of the front seat 21. In this case, the controller 34 determines whether the size of the occupant P is smaller than or equal to the reference size based on the weight of the occupant P, which is obtained based on a signal from the weight sensor. This configuration is particularly suitable for the case where the front seat 21 is a front passenger seat. In this case, the determination of whether the size of the occupant P is smaller than or equal to the reference size is performed by determining whether the weight of the occupant P is less than or equal to a predetermined value (for example, 62.5 kg, or the average value of the weight of the AM50 size and the weight of the AF05 size).

The airbag 27 may be configured to be deployed and inflated to correspond to the thorax of the occupant P having a size larger than the reference size.

Instead of the hook devices 28, winding devices that wind the rear end portions of the tethers 33 may be used. The tension of the tethers 33 applied to the airbag 27 is freely adjusted by adjusting the amount of winding of the tethers 33 by the winding devices. Such winding devices may each include a drum rotated by a motor to wind the tether 33. Alternatively, the mechanism of seat belt pretensioner that winds a seat belt may be applied.

In the case of an occupant P having a size smaller than or equal to the reference size, only one of the hook devices 28 may release the tether 33. In this case, it is preferable to release the tether 33 that corresponds to the shoulder of the occupant P of the AM50 size. This is because, when seated on the front seat 21, the position of the lumbar region of an occupant P having a size smaller than or equal to the reference size is substantially the same as the lumbar region of an occupant having a size larger than the reference size. Therefore, it is possible to quickly restrain the lumbar region of an occupant P having a size smaller than or equal to the reference size, which region has the highest impact resistance in a part from the shoulder to the lumbar region. Thus, the occupant P is reliably protected.

It may be configured that the tethers 33 may be released from the hook devices 28 by breaking sewn portions of the tethers 33 by activation of the rods 31. Specifically, the tethers 33 may be released by breaking the sewn portion of the loop portion 33a. In a case where the rear end portion of each tethers 33 is directly sewn to the airbag 27, this sewn portion may be broken. Alternatively, the tethers 33 per se may be cut.

The determination of whether an occupant P has a reference size may be performed with reference to the AF05 size. In this case, a small occupant P having a size smaller than or equal to the AF05 size is gently restrained.

The invention claimed is:

1. A side airbag apparatus comprising:
a gas generator;
an airbag that is deployed and inflated in a space between a body side portion of a vehicle and an occupant seated on a seat in a passenger compartment by the pressure of gas injected from the as generator, the airbag having a thickness along a lateral direction of the vehicle when deployed and inflated;
an expansion promoting mechanism provided in the airbag, wherein, when the airbag is deployed and inflated, the expansion promoting mechanism promotes the expansion of the thickness of the airbag, wherein the expansion promoting mechanism includes a belt-like tether that is located between opposite inner ends of the airbag and extends in a direction intersecting the lateral direction of the vehicle;

an occupant size detector detecting the size of the occupant; and a promotion canceling mechanism that cancels the expansion promoting function of the expansion promoting mechanism when the size of the occupant detected by the occupant size detector is equal to or smaller than a reference size that is determined in advance such that, if the airbag is deployed and inflated, the thickness of the airbag when the size of the occupant is equal to or smaller than the reference size is less than the thickness when the size of the occupant is greater than the reference size.

2. The side airbag apparatus according to claim 1, wherein the tether suppresses the expansion of the airbag in the fore-and-aft direction of the vehicle, thereby promoting the expansion of the airbag in the lateral direction of the vehicle.

3. The side airbag apparatus according to claim 1, wherein the promotion canceling mechanism includes a hook device to which one of the ends of the tether is hooked, and wherein, when the size of the occupant is equal to or smaller than the reference size, the hook device releases the tether.

4. The side airbag apparatus according to claim 3, wherein the hook device includes a gas generating agent and a movable hook member, the tether being hooked to the hook member, and wherein, when the size of the occupant is equal to or smaller than the reference size, the hook member is actuated by pressure of gas generated by the gas generating agent such that the tether is released from the hook member.

5. The side airbag apparatus according to claim 1, wherein the reference size is an intermediate size between a size of AM50, which corresponds to 50th-percentile adult American male (height: 175 cm, weight 75 kg), and a size of AF05, which corresponds to 5th-percentile adult American female (height: 160 cm, weight 50 kg).

6. The side airbag apparatus according to claim 1, wherein, in a case where the size of the occupant is AM50, which corresponds to 50th-percentile adult American male (height: 175 cm, weight 75 kg), the expansion promoting mechanism promotes the expansion of the airbag in a section that corresponds to at least the lumbar region of the body of the occupant.

7. The airbag apparatus according to claim 1, wherein the occupant size detector includes a sensor for detecting a position of the seat in the fore-and-aft direction of the vehicle.

8. A side airbag apparatus comprising:

an inflator;

an airbag that is deployed and inflated in a space between a body side portion of a vehicle and an occupant seated on a seat in a passenger compartment by the pressure of gas injected from the inflator, the airbag having a thickness along the lateral direction of the vehicle when deployed and inflated;

a hook device, wherein the airbag has a first inner end and a second inner end opposite to each other with respect to the fore-and-aft direction of the vehicle, the hook device being located at the first inner end;

a tether that extends in the fore-and-aft direction of the vehicle, the tether having an end hooked to the hook device and an end fixed to the second inner end, wherein the tether suppresses the expansion of the airbag in the fore-and-aft direction of the vehicle, thereby promoting the expansion of the thickness of the airbag; and an occupant size detector detecting the size of the occupant, wherein, when the size of the occupant detected by the occupant size detector is equal to or smaller than a reference size that is determined in advance, the hook device releases the tether such that the thickness of the airbag when the size of the occupant is equal to or smaller than the reference size is less than the thickness when the size of the occupant is greater than the reference size.

9. The side airbag apparatus according to claim 8, wherein the hook device includes a gas generating agent and a movable hook member, the tether being hooked to the hook member, and wherein, when the size of the occupant is equal to or smaller than the reference size, the hook member is actuated by pressure of gas generated by the gas generating agent such that the tether is released from the hook member.

10. The side airbag apparatus according to claim 8, wherein the reference size is an intermediate size between a size of AM50, which corresponds to 50th-percentile adult American male (height: 175 cm, weight 75 kg), and a size of AF05, which corresponds to 5th-percentile adult American female (height: 160 cm, weight 50 kg).

11. The side airbag apparatus according to claim 8, wherein, in a case where the size of the occupant is AM50, which corresponds to 50th-percentile adult American male (height: 175 cm, weight 75 kg), the expansion of the airbag in the lateral direction of the vehicle is promoted in a section that corresponds to at least the lumbar region of the body of the occupant.

12. The airbag apparatus according to claim 8, wherein the occupant size detector includes a sensor for detecting a position of the seat in the fore-and-aft direction of the vehicle.

* * * * *